US011780022B2

(12) United States Patent
Matsumoto et al.

(10) Patent No.: US 11,780,022 B2
(45) Date of Patent: Oct. 10, 2023

(54) RELIABLE TRANSPORTATION MECHANISM FOR MICRO SOLDER BALLS

(71) Applicant: Western Digital Technologies, Inc., San Jose, CA (US)

(72) Inventors: Yusuke Matsumoto, Fujisawa (JP); Kenichi Murata, Ebina (JP)

(73) Assignee: Western Digital Technologies, Inc., San Jose, CA (US)

( * ) Notice: Subject to any disclaimer, the term of this patent is extended or adjusted under 35 U.S.C. 154(b) by 265 days.

(21) Appl. No.: 16/912,615

(22) Filed: Jun. 25, 2020

(65) Prior Publication Data

US 2020/0324355 A1    Oct. 15, 2020

Related U.S. Application Data

(62) Division of application No. 15/001,724, filed on Jan. 20, 2016, now Pat. No. 10,730,128.

(51) Int. Cl.
| | |
|---|---|
| B23K 1/005 | (2006.01) |
| B23K 1/00 | (2006.01) |
| B23K 3/06 | (2006.01) |
| B23K 35/02 | (2006.01) |
| B23K 26/14 | (2014.01) |
| B23K 3/04 | (2006.01) |
| B23K 101/42 | (2006.01) |

(52) U.S. Cl.
CPC .......... *B23K 1/0056* (2013.01); *B23K 1/0016* (2013.01); *B23K 3/04* (2013.01); *B23K 3/0623* (2013.01); *B23K 26/1476* (2013.01); *B23K 35/0244* (2013.01); *B23K 2101/42* (2018.08)

(58) Field of Classification Search
CPC ....... B23K 1/0056; B23K 1/0016; B23K 3/04

USPC ........ 219/74, 85.13, 121.63, 121.68; 228/41, 228/43, 245, 248.1; 221/263
See application file for complete search history.

(56) References Cited

U.S. PATENT DOCUMENTS

| | | | |
|---|---|---|---|
| 4,942,984 A * | 7/1990 | Miller | B05C 5/0225 228/248.1 |
| 5,467,899 A | 11/1995 | Miller | |
| 5,657,528 A | 8/1997 | Sakemi et al. | |
| 6,152,348 A | 11/2000 | Finn et al. | |
| 6,253,992 B1 | 7/2001 | Fjelstad | |

(Continued)

OTHER PUBLICATIONS

Kohei Tatsumi et al., Micro-Ball Bumping Technology, Nippon Steel Technical Report, Jul. 2001, pp. 46-52, No. 84.

*Primary Examiner* — Tu B Hoang
*Assistant Examiner* — Thomas J Ward
(74) *Attorney, Agent, or Firm* — John D. Henkhaus

(57) ABSTRACT

A solder ball bonding (SBB) tool includes a rotatable feed plate for transporting solder balls from a translatable solder ball reservoir to a nozzle unit, which is a position at which a laser light source can irradiate and thus melt the solder balls. The SBB tool includes a gap between the reservoir and the feed plate positioned over the reservoir, and a feed mechanism coupled with the reservoir, where the feed mechanism is driven by a pressurized gas to translate the reservoir upward across at least a portion of the gap in preparation for movement of a solder ball to the feed plate and downward in preparation for rotation of the feed plate after a solder ball is moved to the feed plate. The gap may have a maximum size that exceeds a nominal size of the solder balls contained in the reservoir.

7 Claims, 6 Drawing Sheets

(56) References Cited

U.S. PATENT DOCUMENTS

| | | | |
|---|---|---|---|
| 7,021,517 B2 | 4/2006 | Zakel et al. | |
| 7,717,317 B2 | 5/2010 | Fujii et al. | |
| 8,038,050 B2 * | 10/2011 | Honma | B23K 1/0016 |
| | | | 438/615 |
| 8,881,967 B2 | 11/2014 | Matsumoto et al. | |
| 9,227,260 B2 * | 1/2016 | Murata | B23K 3/0607 |
| 2001/0015372 A1 | 8/2001 | Yamamoto et al. | |

\* cited by examiner

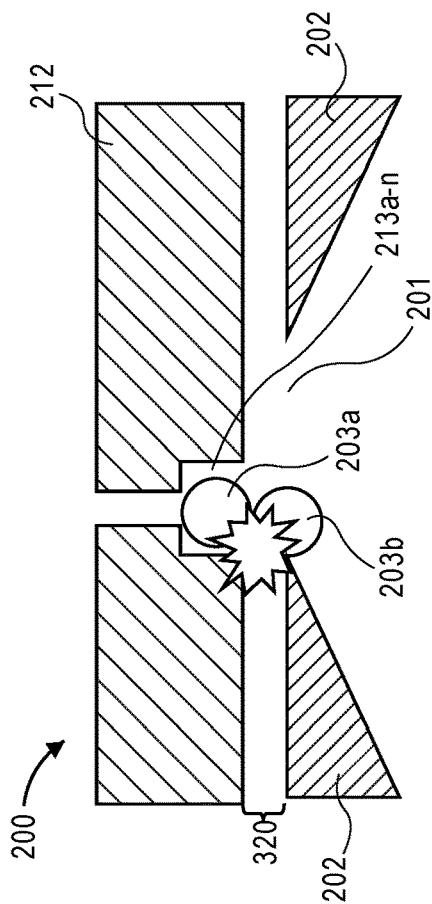
FIG. 3
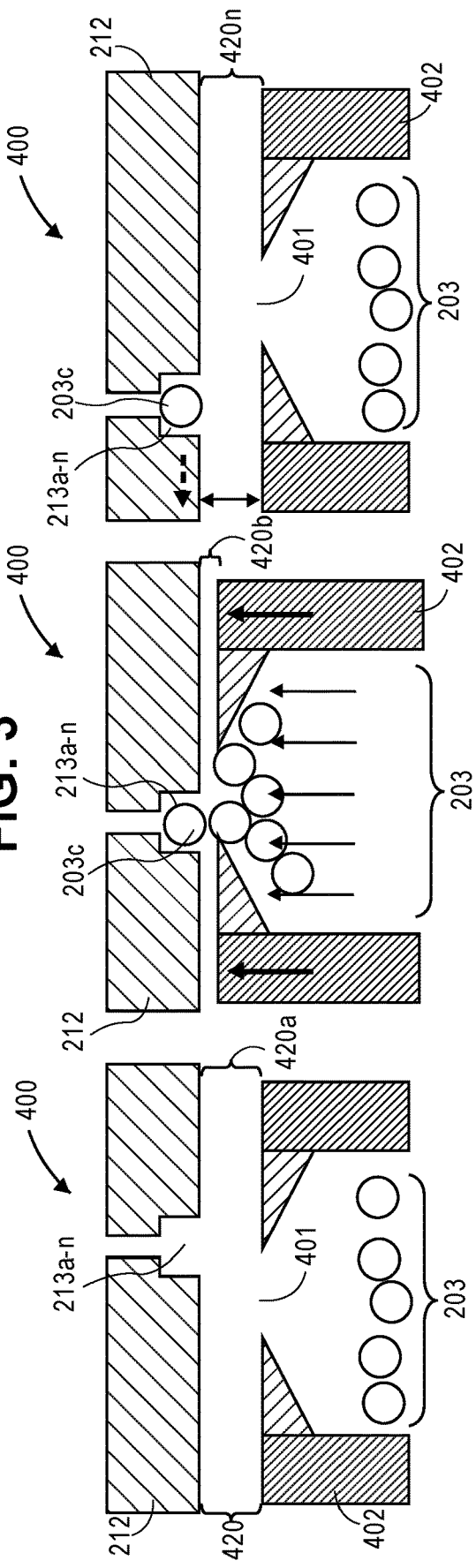
FIG. 4A
FIG. 4B
FIG. 4C

TRANSLATE A SOLDER BALL RESERVOIR UPWARD TOWARD A ROTATABLE FEED PLATE IN PREPARATION FOR THE FEED PLATE RECEIVING A SOLDER BALL FROM THE RESERVOIR
602

↓

MOVE A SOLDER BALL FROM THE RESERVOIR TO THE FEED PLATE
604

↓

TRANSLATE THE SOLDER BALL RESERVOIR DOWNWARD AWAY FROM THE FEED PLATE IN PREPARATION FOR ROTATING THE FEED PLATE
606

↓

ROTATE THE FEED PLATE
608

FIG. 6

RELIABLE TRANSPORTATION MECHANISM FOR MICRO SOLDER BALLS

CROSS-REFERENCE TO RELATED APPLICATIONS

This application is a divisional of and claims the benefit of priority to U.S. patent application Ser. No. 15/001,724, filed Jan. 20, 2016, the entire content of which is incorporated by reference for all purposes as if fully set forth herein.

FIELD OF THE INVENTION

Embodiments of the invention relate to a reliable transportation mechanism for a solder ball bonding device.

BACKGROUND

A hard-disk drive (HDD) is a non-volatile storage device that is housed in a protective enclosure and stores digitally encoded information on at least one circular disk having magnetic surfaces. When an HDD is in operation, each magnetic-recording disk is rapidly rotated by a spindle system. Information is read from and written to a magnetic-recording disk using a read-write head that is positioned over a specific location of a disk by an actuator. A read-write head uses a magnetic field to read information from and write information to the surface of a magnetic-recording disk. A write head makes use of the electricity flowing through a coil, which produces a magnetic field. Electrical pulses are sent to the write head, with different patterns of positive and negative currents. The current in the coil of the write head induces a magnetic field across the gap between the head and the magnetic disk, which in turn magnetizes a small area on the recording medium.

An HDD includes at least one head gimbal assembly (HGA) that typically includes a slider housing a read/write head (also referred to as a "head slider"), a lead suspension with which the head slider is coupled, and a load beam with which the suspension is coupled. The head slider is attached at the distal end of the load beam to a gimbal mechanism. Typically, the head slider is electrically interconnected to the lead suspension via connection pads on the respective components, which are solder ball bonded together to form the final electrical interconnection between the components. One solder ball bonding procedure places a solder ball between the connection pad of the head slider and the connection pad of the suspension, reflows the solder ball by using laser light, and electrically interconnects the connection pad of the head slider and the connection pad of the suspension.

One particular approach to solder ball bonding very small components, such as a head slider to a suspension, is through use of a solder ball bonding (SBB) tool that includes a solder ball reservoir or tank in positional relation to a rotatable feed plate. A supply of solder balls (or "micro solder balls") is housed in the reservoir, from which solder balls are fed one-by-one to the rotatable feed plate. The feed plate then rotates into one or more other process positions for enabling irradiation of and ejection of solder balls onto the workpieces to be interconnected, such as the head slider and the suspension. However, such SBB tools may tend to clog, whereby a solder ball may be inadvertently captured or lodged between the reservoir and the feed plate and consequently deformed, possibly causing a number of malfunctions of the SBB tool and associated bonding process.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF EMBODIMENTS

Embodiments of the invention are directed at a solder ball bonding (SBB) tool and a method of solder ball bonding work pieces, such as components of a head gimbal assembly (HGA) of a hard-disk drive (HDD). The SBB tool comprises a rotatable feed plate for transporting solder balls from a translatable solder ball reservoir to a nozzle unit, which is in a position at which a laser light source can irradiate and thus melt the solder balls. The melted solder ball is then able to be ejected from a nozzle and onto one or more work pieces, for electrically interconnecting the work pieces.

Embodiments include a gap between the reservoir and the feed plate positioned over the reservoir, and a feed mechanism coupled with the reservoir, where the feed mechanism is driven by a pressurized gas to translate the reservoir upward in preparation for movement of a solder ball to the feed plate and downward in preparation for rotation of the feed plate after a solder ball is moved to the feed plate. Embodiments further include a gap having a maximum size that exceeds a nominal size of solder balls housed or contained in the reservoir.

Embodiments discussed in the Summary of Embodiments section are not meant to suggest, describe, or teach all the embodiments discussed herein. Thus, embodiments of the invention may contain additional or different features than those discussed in this section. Furthermore, no limitation, element, property, feature, advantage, attribute, or the like expressed in this section, which is not expressly recited in a claim, limits the scope of any claim in any way.

BRIEF DESCRIPTION OF THE DRAWINGS

Embodiments are illustrated by way of example, and not by way of limitation, in the figures of the accompanying drawings and in which like reference numerals refer to similar elements and in which:

FIG. 3 is a cross-sectional side view of a clogged solder ball bonding tool;

FIG. 4A, FIG. 4B, and FIG. 4C are cross-sectional side views illustrating a solder ball capture process using a multi-hole feed plate of a solder ball bonding tool, according to an embodiment;

FIG. 6 is a flow diagram illustrating a method of solder ball bonding two work pieces using a rotatable feed plate, according to an embodiment.

DETAILED DESCRIPTION

Approaches to a reliable transportation mechanism for a solder ball bonding tool are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of Illustrative Operating Context

Embodiments may be used in the context of inhibiting the clogging of a solder ball bonding tool, such as but not limited to a tool that may be used for bonding a head slider to a suspension of a head gimbal assembly (HGA) of a hard disk drive (HDD) storage device. Thus, in accordance with an embodiment, a plan view illustrating an HDD 100 is shown in FIG. 1 to illustrate an exemplary operating context.

Figure 1:
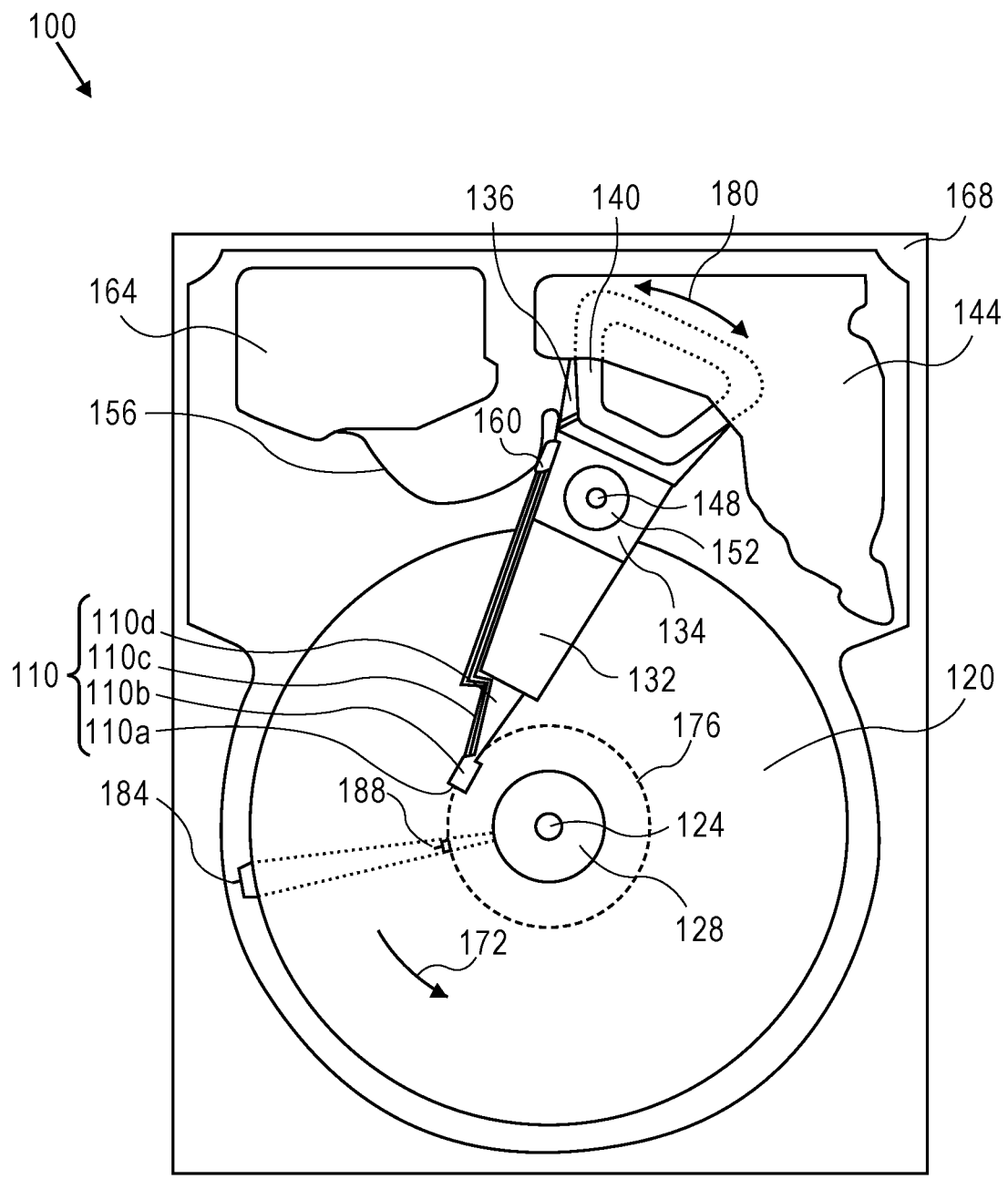
FIG. 1 is a plan view of an HDD, according to an embodiment.

FIG. 1 illustrates the functional arrangement of components of the HDD 100 including a slider 110b that includes a magnetic read-write head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one recording medium 120 rotatably mounted on a spindle 124 and a drive motor (not visible) attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are transmitted by a flexible cable assembly (FCA) 156 (or "flex cable"). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Introduction

Recall that one possible approach to solder ball bonding very small components, such as a head slider to a suspension, is through use of a solder ball bonding (SBB) tool that includes a solder ball reservoir or tank in positional relation to a rotatable feed plate. A supply of solder balls (or "micro solder balls") is housed in the reservoir, from which solder balls are fed one-by-one to the rotatable feed plate. The feed plate then rotates into one or more other process positions for enabling irradiation of and ejection of solder balls onto the workpieces to be interconnected, such as the head slider and the suspension.

One such SBB tool is described and illustrated in U.S. patent application Ser. No. 13/767,023 filed on Feb. 14, 2013, and entitled "High-Speed Transportation Mechanism For Micro Solder Balls", the entire content of which is incorporated by reference for all purposes as if fully set forth herein.

Figure 2A:
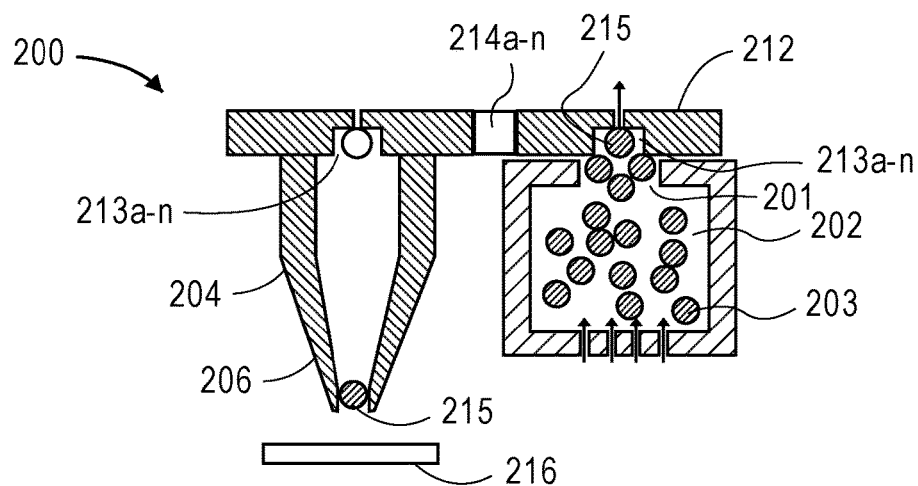
FIG. 2A, FIG. 2B, and FIG. 2C are cross-sectional side views illustrating a solder ball jet process using a multi-hole feed plate of a solder ball bonding tool, according to an embodiment.
Figure 2B:
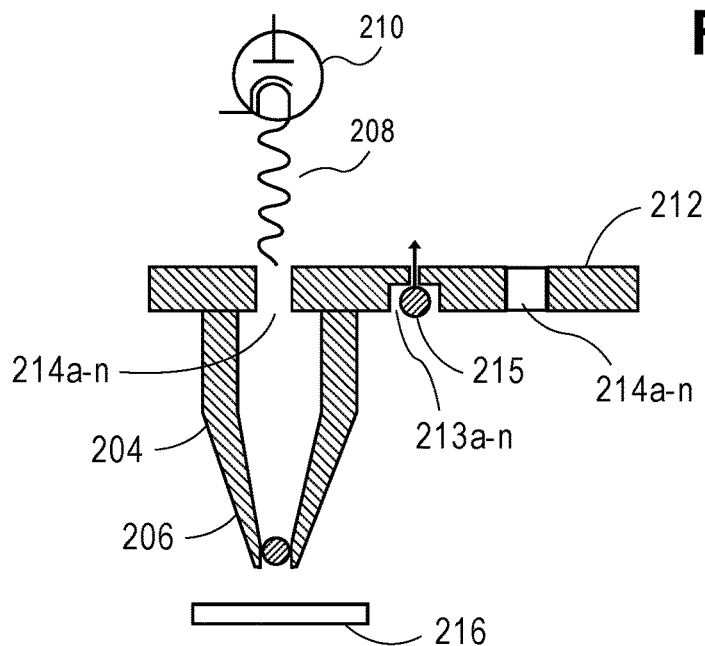
Figure 2C:
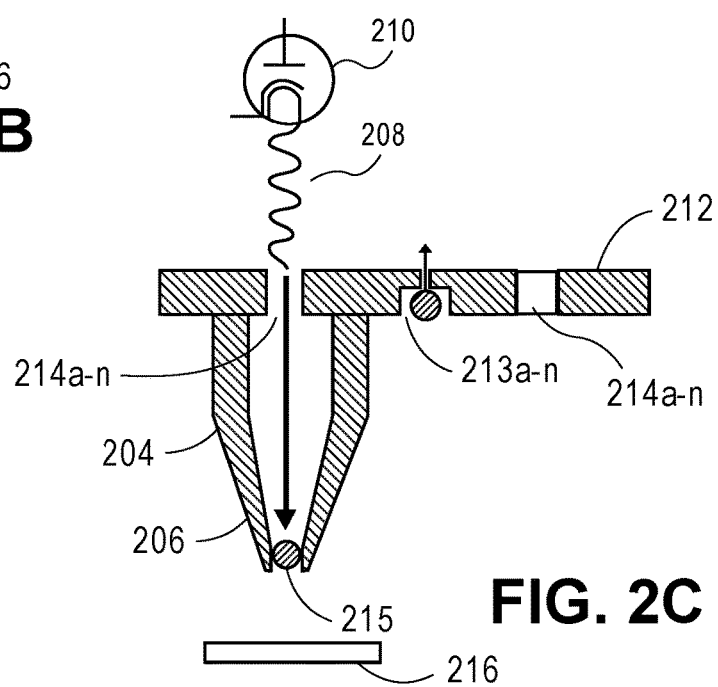

FIG. 2A, FIG. 2B, and FIG. 2C are cross-sectional side views illustrating a solder ball jet process using a multi-hole feed plate of a solder ball bonding tool, according to an embodiment. The main components of an SBB tool 200 comprise a solder ball reservoir 202 having an exit opening 201, a nozzle unit 204, a nozzle 206, a laser light source 210 (FIGS. 2B, 2C), and feed plate 212. The solder ball reservoir 202 is configured for housing, or containing, a plurality of solder balls 203. The nozzle unit 204 is configured for directing a solder ball into the nozzle 206 and for facilitating the ejection of the solder ball from the nozzle 206 onto one or more work piece 216, using a pressurized gas. The laser light source 210 is configured for irradiating, with laser light 208 (FIGS. 2B, 2C), a solder ball 215 residing in nozzle 206. Irradiating solder ball 215 with the laser light 208 causes solder ball 215 to melt, or at least begin to melt or partially melt, so that the melted solder ball 215 can be ejected from nozzle 206 onto the one or more work piece 216.

SBB tool 200 is configured such that the feed plate 212 rotates so that solder ball holes 213*a-n* and laser holes 214*a*-214*n*, which may be positioned alternately in the feed plate 212, rotate past the solder ball reservoir 202 and the nozzle unit 204. Solder ball holes 213*a-n* are configured for receiving solder balls 203 from solder ball reservoir 202 through the exit opening 201 as each solder ball hole 213*a-n* rotates past the reservoir 202. As the feed plate 212 rotates and a solder ball hole 213*a-n* is positioned over the solder ball reservoir 202, compressed gas is blown through the reservoir 202 (e.g., from below the reservoir 202) to create suction and thus force solder ball 215 through the exit opening 201 into a solder ball hole 213*a-n* positioned above the reservoir 202.

FIG. 2B illustrates the feed plate 212 rotated to a position past its position in FIG. 2A. As such, the solder ball hole 213*a-n* is no longer above the solder ball reservoir 202 and is rotating toward a position over the nozzle unit 204. As the feed plate 212 is rotating from a position over the solder ball reservoir 202 to a position over the nozzle unit 204, a suction force may be continuously applied to the solder ball 215 so that solder ball 215 remains housed in the solder ball hole 213*a-n*.

FIG. 2C illustrates the feed plate 212 rotated to a position past its position in FIG. 2B. As such, the subject solder ball hole 213*a-n* has now rotated past the nozzle unit 204 and has ejected solder ball 215 into the nozzle 206 of nozzle unit 204. Solder ball 215 can be ejected into the nozzle 206 via gravity or via a compressed gas. At this stage of the process, a laser hole 214*a*-214*n* is now positioned over the nozzle unit 204 such that laser light source 210 can irradiate and melt the solder ball 215 currently positioned in nozzle 206, with laser light 208. Laser holes 214*a*-214*n* function as an aperture through which the laser light 208 produced by laser light source 210 is incident upon the solder ball 215. Once the solder ball 215 has been at least partially melted by the laser light 208, the melted solder ball 215 is ejected onto one or more work piece 216, typically by a compressed inert gas such as nitrogen gas.

Interconnecting by solder ball bonding according to an embodiment interconnects the connection pads of the head slider (e.g., slider 110*b* and head 110*a* of FIG. 1) to the connection pads on the gimbal or suspension. In an HGA having a micro actuator, the connection pads of the head slider and the connection pads of the micro actuator, or the connection pads of the micro actuator and the connection pads of the gimbal/suspension, are also interconnected. However, use of the described embodiments of the invention are not limited to use for manufacturing an HGA or an HDD. Rather, embodiments may be implemented for use in any micro solder ball bonding process.

While the foregoing SBB tool 200 and approach are effective, such an SBB tool may at times have issues with clogging, whereby a solder ball may be inadvertently captured or lodged between the reservoir 202 and the feed plate 212. Consequent deformation of the lodged solder ball may possibly cause a malfunction of the SBB tool 200 and the associated bonding process. For example, FIG. 3 is a cross-sectional side view of a clogged solder ball bonding tool. FIG. 3 depicts the SBB tool 200 comprising the solder ball reservoir 202 positioned beneath, below the rotatable feed plate 212. The rotatable feed plate 212 is shown with a solder ball 203*a* captured within a solder ball hole 213*a-n*. As the solder ball hole 213*a-n* of the feed plate 212 is rotating away from the exit opening 201 of the reservoir 202, a second solder ball 203*b* is depicted as undesirably lodged, or clogged, in a fixed gap 320 between the reservoir 202 and the feed plate 212.

Translatable Solder Ball Reservoir for Solder Ball Bonding Tool

FIG. 4A, FIG. 4B, and FIG. 4C are cross-sectional side views illustrating a solder ball capture process using a multi-hole feed plate of a solder ball bonding tool, according to an embodiment. FIGS. 4A-4C depict a SBB tool 400 comprising a translatable solder ball reservoir 402, having an exit opening 401 and containing solder balls 203. Reservoir 402 is positioned beneath or below the rotatable feed plate 212, having solder ball holes 213a-n, with a variable gap 420 between the reservoir 402 and the feed plate 212. FIG. 4A further depicts that the reservoir 402 and the feed plate 212 are in a positional relationship, i.e., they are positioned relative to each other, such that the variable gap 420 is at a position of larger gap 420a (as compared with a position of smaller gap 420b of FIG. 4B).

FIG. 4B again depicts the translatable solder ball reservoir 402, having an exit opening 401 (FIG. 4A) and containing solder balls 203, and positioned beneath or below the rotatable feed plate 212 having solder ball holes 213a-n. FIG. 4B further depicts that the reservoir 402 and the feed plate 212 are in a positional relationship such that the variable gap 420 (FIG. 4A) is at a position of smaller gap 420b (as compared to the larger gap 420a of FIG. 4A). The rotatable feed plate 212 is shown with a solder ball 203c captured within a solder ball hole 213a-n.

SBB tool 400 operates in a manner such that when the feed plate 212 is rotating in preparation for receiving one of the solder balls 203, that is, when a solder ball hole 213a-n is approaching and/or over the exit opening 401, the reservoir 402 translates (or moves, such as linearly) upward in the vertical direction across at least a portion of the larger gap 420a to a position of smaller gap 420b. Hence, and with reference to FIG. 4C, as the solder ball hole 213a-n of the feed plate 212 is rotating away from the exit opening 401 of the reservoir 402, SBB 400 is inhibited from and less likely to experience a lodged or clogged solder ball within the variable gap 420 (FIG. 4A), in contrast with that illustrated and described in reference to the fixed gap 320 of FIG. 3. Furthermore, SBB tool 400 operates in a manner such that when the feed plate 212 is rotating away from the exit opening 401 of the reservoir 402 in preparation for irradiating the solder ball 203c captured within the solder ball hole 212a-213n, the reservoir 402 translates (or moves) downward in the vertical direction to a new position relative to the feed plate 212, having a gap 420n therebetween.

According to an embodiment, a maximum size of the variable gap 420 is greater than (or exceeds) a nominal size of the solder balls 203 housed or contained within the reservoir 402. Thus, when the reservoir 402 translates upward to close or contract the variable gap 420 for moving a solder ball 203c into a solder ball hole 213a-n of the feed plate 212, and translates downward to expand the variable gap 420 for rotating the solder ball hole 213a-n of feed plate 212 away from the exit opening 401 of the reservoir 402, the possibility that a solder ball 203 gets lodged within the variable gap 420 is diminished, if not eliminated.

Solder Ball Feeder for Solder Ball Bonding Tool

Figure 5A:
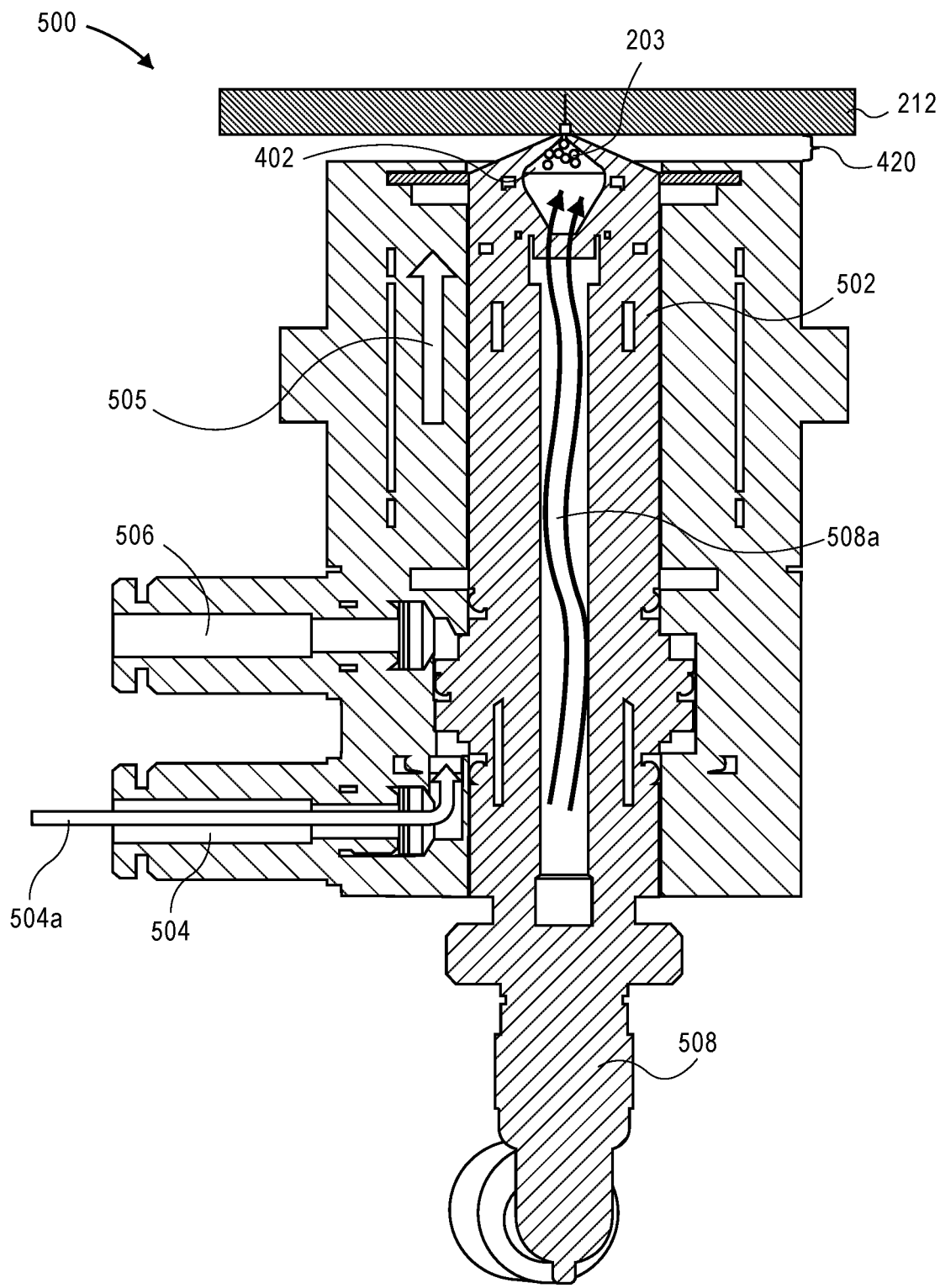
FIG. 5A and FIG. 5B are cross-sectional side views illustrating a solder ball feeder of a solder ball bonding tool, according to an embodiment.
Figure 5B:
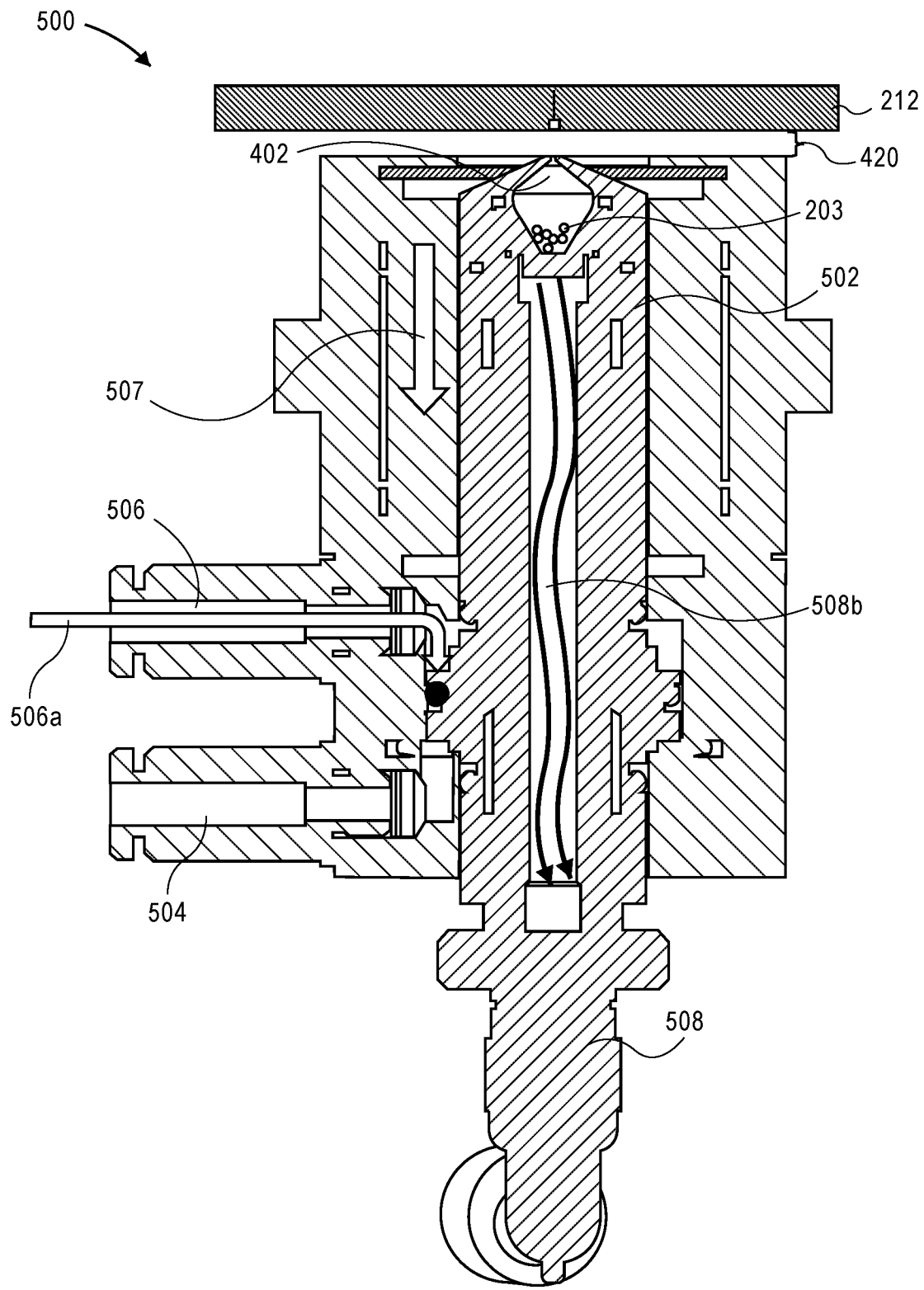

FIG. 5A and FIG. 5B are cross-sectional side views illustrating a solder ball feeder of a solder ball bonding (SBB) tool, according to an embodiment. Feeder 500 is positioned beneath the feed plate 212 and comprises a solder ball feed mechanism 502 coupled with the solder ball reservoir 402, with a variable gap 420 therebetween. With reference first to FIG. 5A, feed mechanism 502 comprises or is coupled with a compressed gas source 508 which supplies a compressed (pressurized) gas 508a (such as an inert or non-reactive gas, such as nitrogen) through a central chamber and into the reservoir 402, thus functioning to blow or move a solder ball 203 to the feed plate 212 (e.g., into a solder ball hole 213a-n of the feed plate 212 of FIGS. 4A-4C).

Feeder 500 further comprises an upward translation gas source 504, which supplies a compressed (pressurized) gas 504a (such as air) that functions to translate upward the feed mechanism 502 and the reservoir 402 coupled therewith (where the upward translation is illustrated with upward arrow 505). Hence, in conjunction with the operation of the gas source 508 supplying pressurized gas 508a to the reservoir 402 to move a solder ball 203 to the feed plate 212, the upward translation gas source 504 supplies pressurized gas 504a to the feed mechanism 502 to translate the feed mechanism 502 upward toward the feed plate 212, thereby reducing the variable gap 420. According to an embodiment, the feed mechanism 502 and reservoir 402 are translated upward just before the pressurized gas 508a is supplied to the reservoir 402 to move a solder ball 203 to the feed plate 212. Thus, the variable gap 420 is reduced by way of the upward translation of the feed mechanism 502 and the reservoir 402 just prior to the movement of the solder ball 203 supply upward within the reservoir 402, thereby inhibiting or eliminating the likelihood of a solder ball 203 inadvertently and undesirably lodging between the reservoir 402 and the feed plate 212. However, while the foregoing operations are described as occurring in series, in practice the foregoing operations may be implemented to occur effectively simultaneously or concurrently.

With reference to FIG. 5B, the operation of the compressed gas source 508 can be reversed, so as to apply a negative pressure 508b through the central chamber and to the reservoir 402, thus functioning to allow the supply of solder balls 203 in the reservoir 402 to fall back down within the reservoir 402. Feeder 500 further comprises a downward translation gas source 506, which supplies a compressed (pressurized) gas 506a (such as air) that functions to translate downward the feed mechanism 502 and the reservoir 402 coupled therewith (where the downward translation is illustrated with downward arrow 507). Hence, in conjunction with the operation of the gas source 508 supplying a negative pressure 508b to the reservoir 402 to allow the supply of solder balls 203 to retreat away from the opening 401 (FIGS. 4A, 4C) of the reservoir 402, the downward translation gas source 506 supplies pressurized gas 506a to the feed mechanism 502 to translate the feed mechanism 502 downward away from the feed plate 212, thereby increasing the variable gap 420. According to an embodiment, the feed mechanism 502 and reservoir 402 are translated downward just before the feed plate 212 is rotated such that the solder ball hole 213a-n of the feed plate 212 is rotating away from the exit opening 401 of the reservoir 402 (such as described and illustrated in reference to FIG. 4C). Thus, the variable gap 420 is increased by way of the downward translation of the feed mechanism 502 and the reservoir 402 just prior to the rotation of the feed plate 212, thereby inhibiting or eliminating the likelihood of a solder ball 203 inadvertently and undesirably lodging between the reservoir 402 and the feed plate 212. However, while the foregoing operations are described as occurring in series, in practice the foregoing operations may be implemented to occur effectively simultaneously or concurrently.

A Method of Solder Ball Bonding Work Pieces

FIG. 6 is a flow diagram illustrating a method of solder ball bonding two work pieces using a rotatable feed plate, according to an embodiment. The method depicted in FIG.

6 may be implemented for use with the mechanisms described and illustrated in reference to FIGS. 4A-4C and FIGS. 5A, 5B.

At block 602, a solder ball reservoir is translated upward toward a rotatable feed plate in preparation for the feed plate receiving a solder ball from the reservoir. For example, solder ball reservoir 402 (FIG. 5A) is translated upward 505 (FIG. 5A) toward the rotatable feed plate 212 in preparation for the feed plate 212 receiving a solder ball 203 (FIG. 5A) from the reservoir 402. The manner in which the reservoir 402 is translated upwardly toward the feed plate 212 may be implemented using a gas source 504 that supplies a pressurized gas 504a (such as air) to translate the feed mechanism 502 as, or similar to as, described in reference to FIG. 5A.

At block 604, a solder ball is moved from the reservoir to the feed plate. For example, a solder ball 203 (FIG. 5A) is moved from the reservoir 402 (FIG. 5A) to the feed plate 212 (FIG. 5A). The manner in which the solder ball 203 is moved from the reservoir 402 to the feed plate 212 may be implemented using a gas source 508 supplying a pressurized gas 508a to the reservoir 402 as, or similar to as, described in reference to FIG. 5A.

At block 606, the solder ball reservoir is translated downward away from the feed plate in preparation for rotating the feed plate. For example, solder ball reservoir 402 (FIG. 5B) is translated downward 507 (FIG. 5B) away from the rotatable feed plate 212 (FIG. 5B) in preparation for rotating the feed plate 212. The manner in which the reservoir 402 is translated downwardly away from the feed plate 212 may be implemented using a gas source 506 that supplies a pressurized gas 506a (such as air) to translate the feed mechanism 502 as, or similar to as, described in reference to FIG. 5B. According to an embodiment, prior to translating the solder ball reservoir downward away from the feed plate (block 606), a negative pressure may be applied inside of the reservoir to allow the supply of solder balls 203 (FIG. 5B) in the reservoir 402 to fall back down within the reservoir 402, such as described in reference to FIG. 5B.

At block 608, the feed plate is rotated. For example, the feed plate 212 is rotated such that the solder ball hole 213a-n (FIG. 4C) of the feed plate 212 is rotating away from the exit opening 401 (FIG. 4C) of the reservoir 402.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A method of solder ball bonding a first work piece to a second work piece using a rotatable feed plate, the method comprising:
    translating, via a first pressurized gas mechanism, a solder ball reservoir housing a plurality of solder balls toward the feed plate in preparation for the feed plate receiving a solder ball from the reservoir;
    moving, by supplying pressurized gas into the reservoir via a second pressurized gas mechanism different from the first pressurized gas mechanism, a solder ball from the reservoir to the feed plate;
    translating, via a third pressurized gas mechanism different from the first and second pressurized gas mechanism, the reservoir away from the feed plate in preparation for rotating the feed plate; and
    rotating the feed plate.

2. The method of claim 1, wherein translating the reservoir includes driving a feed mechanism with which the reservoir is coupled with a pressurized gas.

3. The method of claim 1, wherein translating the reservoir includes driving a feed mechanism with which the reservoir is coupled with pressurized air.

4. The method of claim 1, wherein a maximum distance between the reservoir and the feed plate exceeds a nominal size of solder balls contained in the reservoir.

5. The method of claim 1, wherein moving the solder ball includes applying the pressurized gas to the solder ball, the method further comprising:
    prior to translating the reservoir away from the feed plate, applying a negative pressure inside of the reservoir.

6. The method of claim 1, wherein rotating the feed plate includes:
    rotating the feed plate so that a solder ball hole is rotated to a position over a nozzle to eject the solder ball into the nozzle; and
    rotating the feed plate so that a laser hole is rotated to a position over the nozzle to provide an aperture for laser light to pass therethrough to irradiate the solder ball;
    the method further comprising:
    ejecting melted solder from the nozzle into proximity with respective connection pads on the first and second work pieces.

7. The method of claim 1, wherein the first work piece is a head slider for a hard disk drive and the second work piece is a suspension for the hard disk drive.

\* \* \* \* \*